United States Patent [19]
Goodrich et al.

[11] Patent Number: 5,975,830
[45] Date of Patent: Nov. 2, 1999

[54] UNDER FLOOR WHEELCHAIR LIFT

[76] Inventors: Ronald W. Goodrich, 2716 Northwood Dr., Logansport, Ind. 46947; Russell G. Antrim, RR3 Box 81, Winamac, Ind. 46996

[21] Appl. No.: 09/065,666

[22] Filed: Apr. 23, 1998

[51] Int. Cl.⁶ ...................................................... B60F 1/44
[52] U.S. Cl. ......................... 414/541; 414/812; 414/917; 414/921
[58] Field of Search ................... 414/540, 549, 414/544–546, 556, 558, 917, 921, 812, 541; 187/240, 244

[56] References Cited

U.S. PATENT DOCUMENTS

| | | | |
|---|---|---|---|
| 3,913,759 | 10/1975 | Deacor | 414/921 X |
| 3,984,014 | 10/1976 | Pohl | 414/921 X |
| 4,010,859 | 3/1977 | Ronian et al. | 414/921 X |
| 4,155,468 | 5/1979 | Royce | 414/556 |
| 4,252,491 | 2/1981 | Hock | 414/540 |
| 4,273,217 | 6/1981 | Kajita | 414/921 X |
| 4,474,527 | 10/1984 | Risner et al. | 414/921 X |
| 4,958,979 | 9/1990 | Svensson | 414/921 X |
| 5,158,419 | 10/1992 | Kempf et al. | 414/921 X |
| 5,253,973 | 10/1993 | Fretwell | 414/545 X |
| 5,261,779 | 11/1993 | Goodrich | 414/921 X |
| 5,346,355 | 9/1994 | Riemer | 414/921 X |
| 5,373,915 | 12/1994 | Tremblay | 414/921 X |
| 5,556,250 | 9/1996 | Fretwell et al. | 414/549 X |

*Primary Examiner*—David A. Bucci
*Attorney, Agent, or Firm*—Jacques M. Dulin; Robert F. Dennis; Heller Ehram White & McAuliffe

[57] ABSTRACT

An under floor lift comprising a horizontal, U-shaped header framework which is mountable between a vehicle axle and floor, and which reciprocatingly receives a nestable carriage comprising a second U-shaped framework. The carriage comprises a transverse motor mount plate and a pair of spaced, horizontal arms between which is received the lift platform. The platform is pivotably suspended, lifted and lowered by spaced pairs of parallelogram linkages pivotably secured at their outboard ends to the outboard end of the carriage side rails and at their inboard ends to the inboard end of the lift platform. The carriage is telescoped by a gear and chain mechanism from an inboard stowed position horizontally out to a transfer level deployed position. The wheelchair lift is moved by a hydraulic/chain drive downwardly and upwardly supported by the parallelogram arms to or from a ground level position, to permit the lift to be an in-swing, negative type lift. An automatically transitioning inboard bridge plate is pivoted to the platform, and during decent inclines and forms an inboard barrier. The bridge plate is slidably mounted on channels or rails which are in turn mounted on a support plate pivotably mounted to the outboard edge of the carriage motor mount plate. The combination of the bridge and support plate assembly provides excellent stability to the lift mechanism, essentially eliminating lateral sway way and the problems attendant thereto.

25 Claims, 9 Drawing Sheets

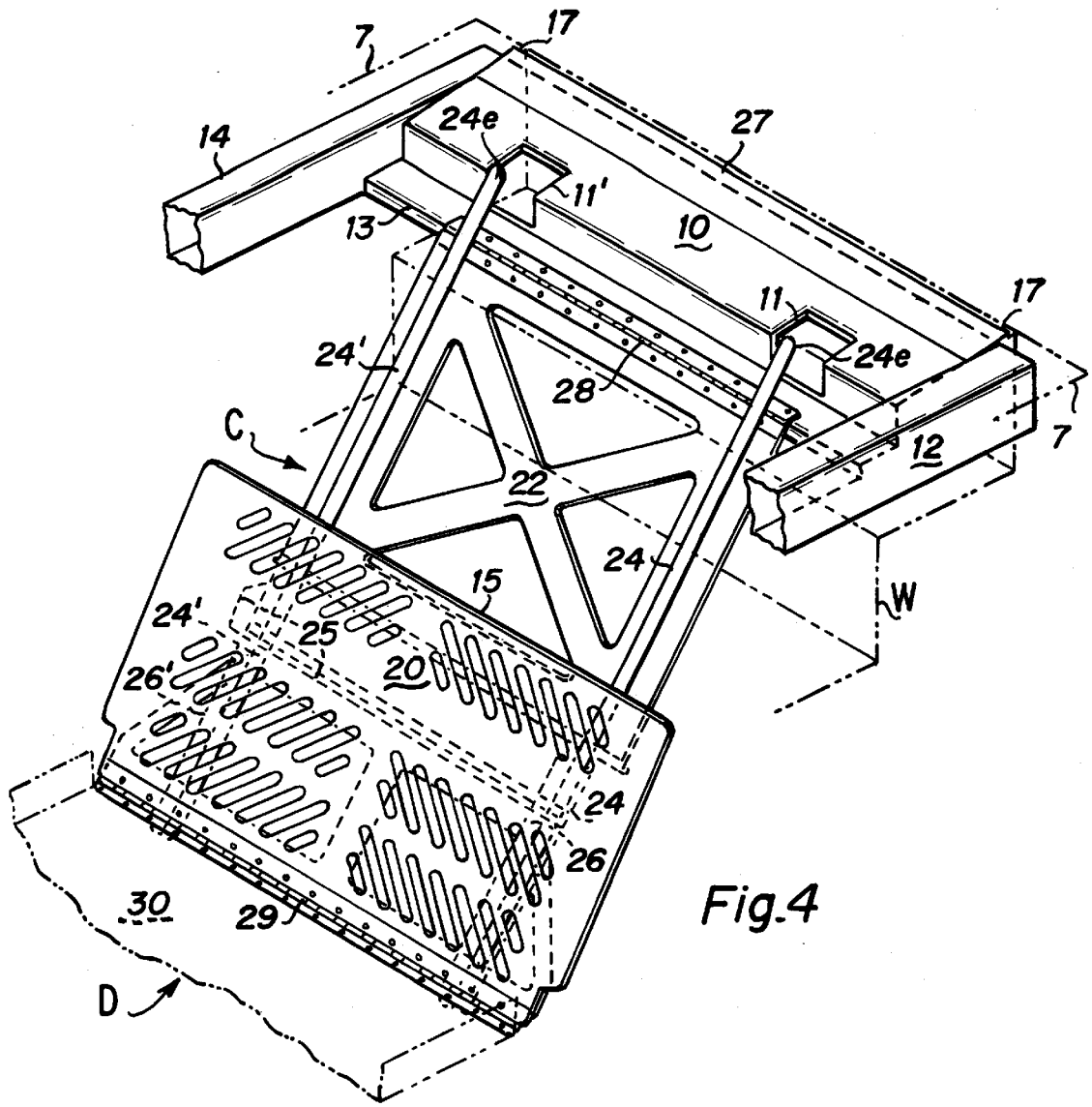
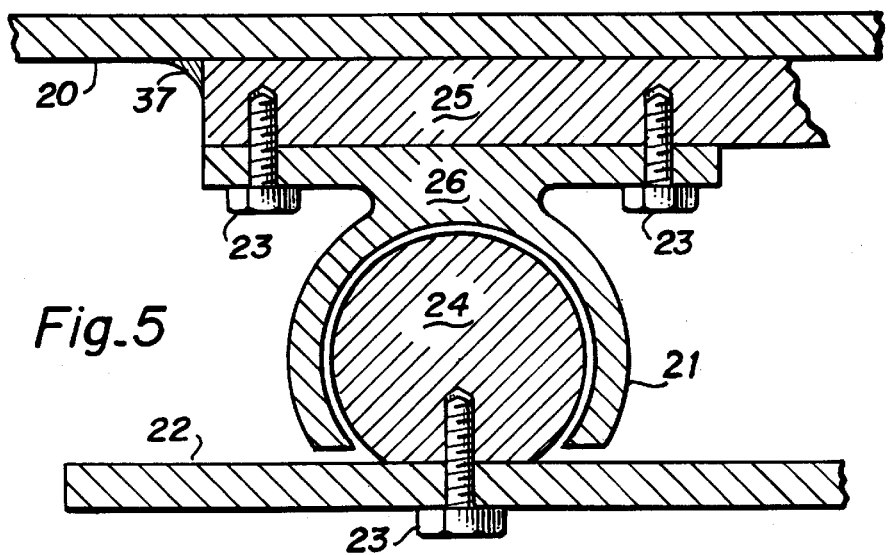

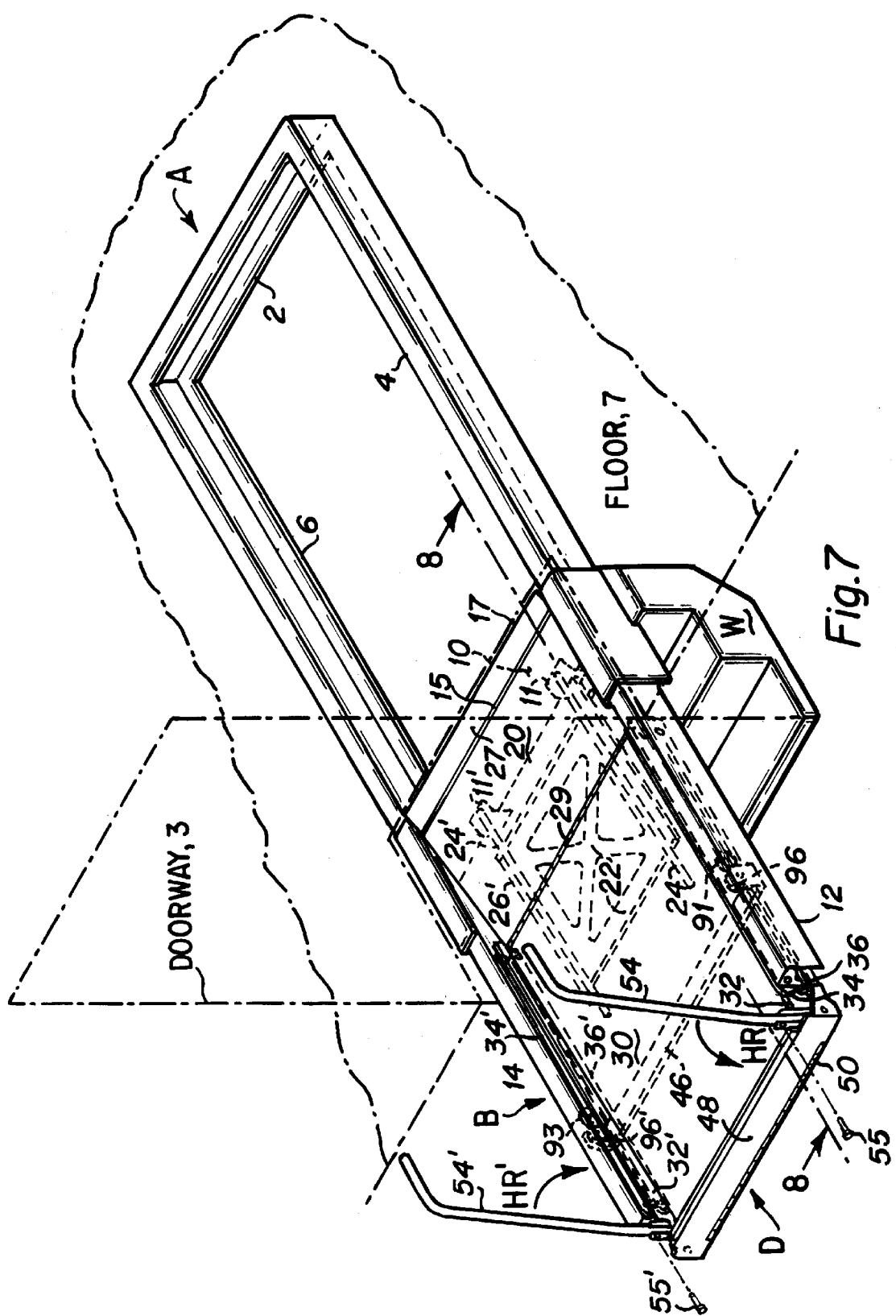

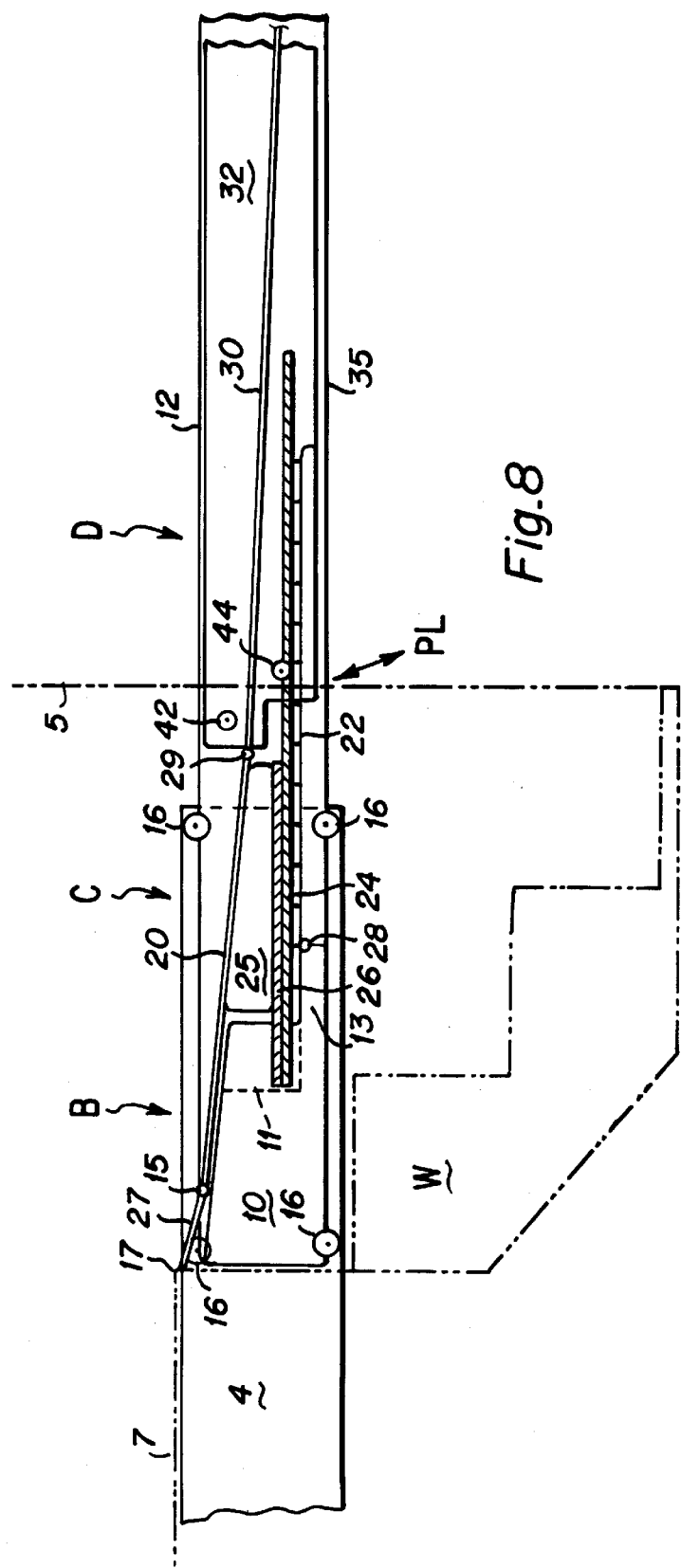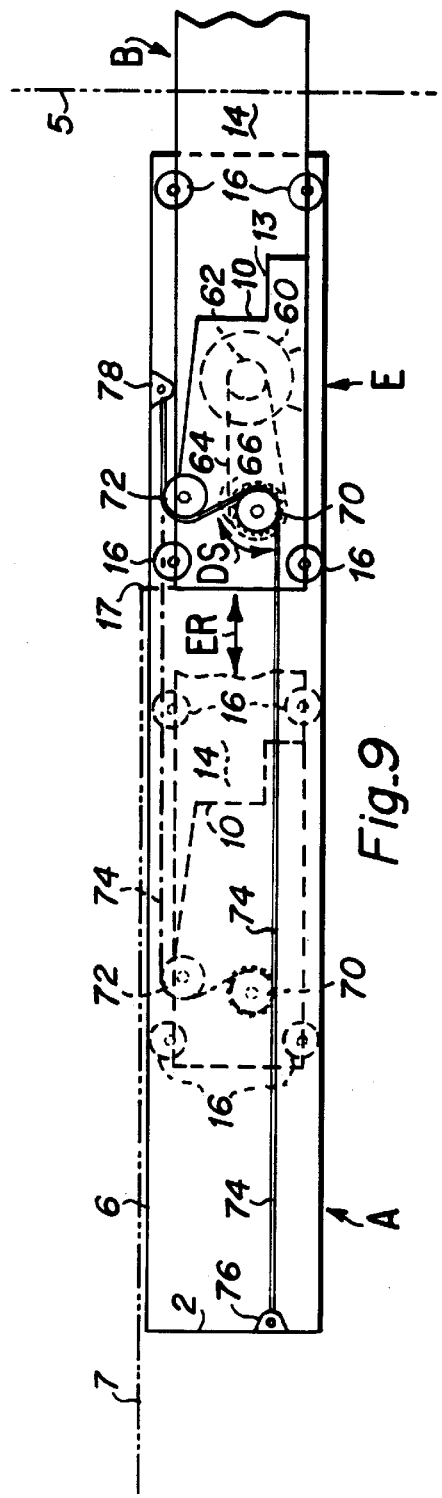
Fig.8
Fig.9

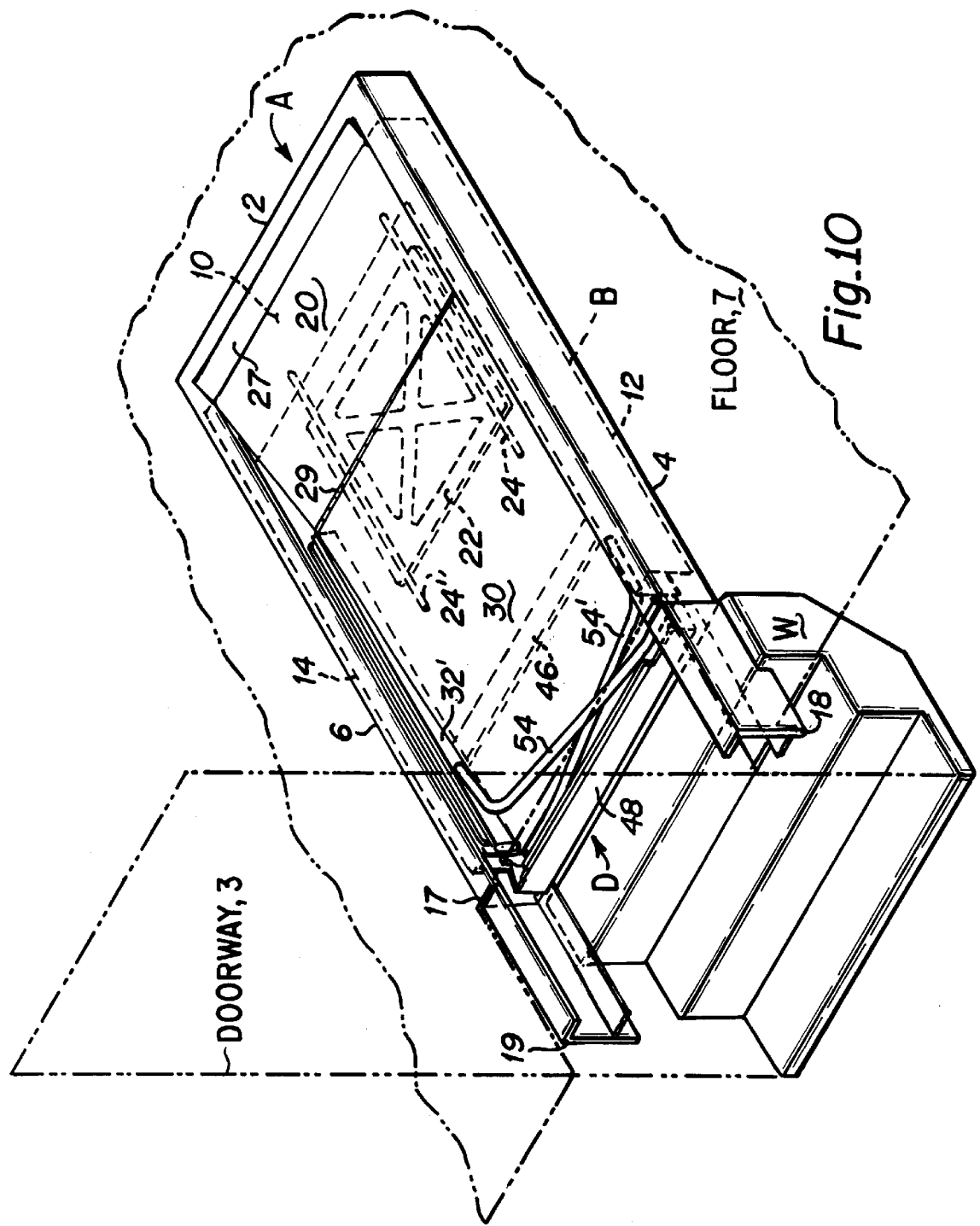

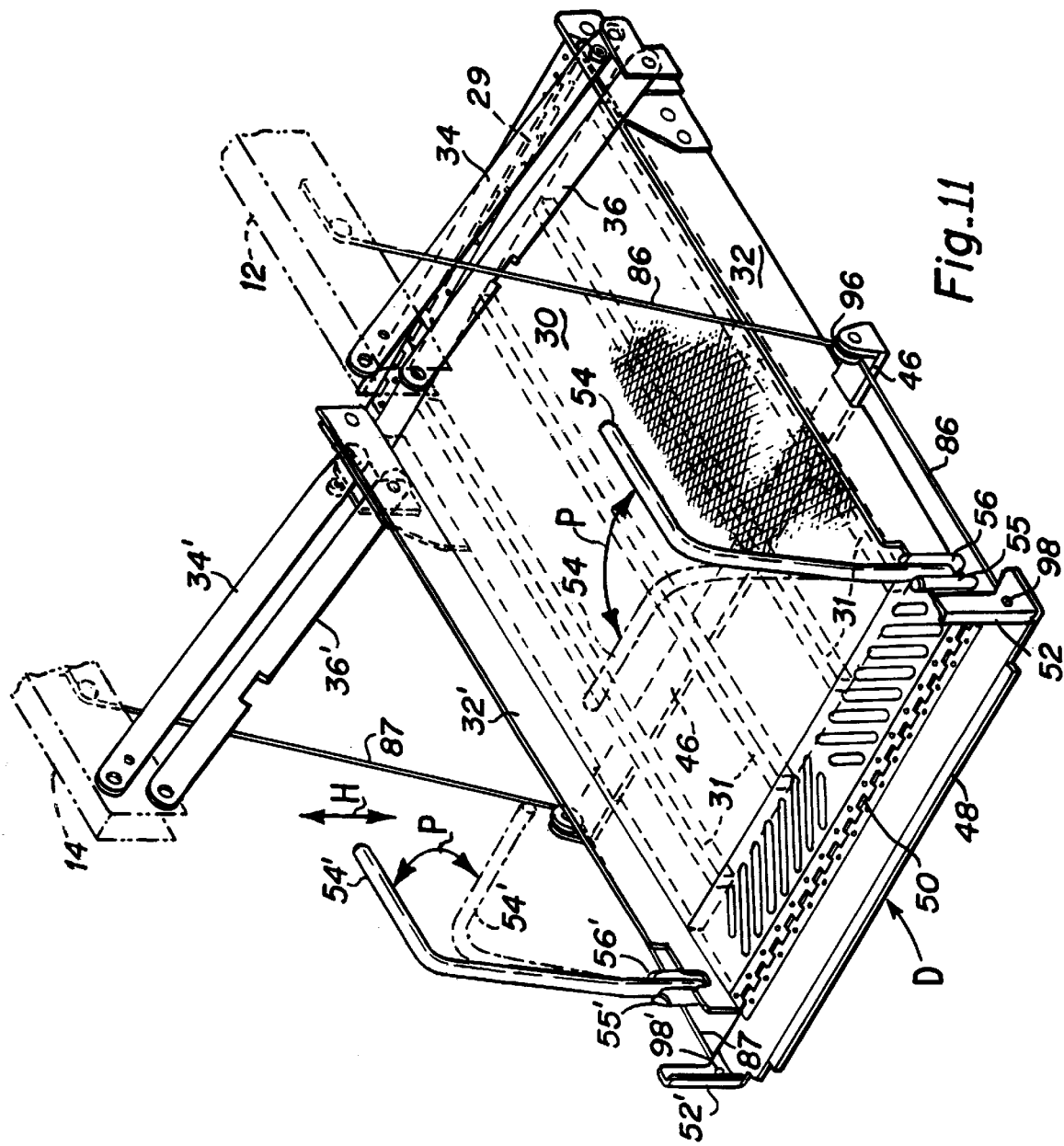

UNDER FLOOR WHEELCHAIR LIFT

CROSS REFERENCE TO RELATED CASE

This Application is a based on Provisional Application SN 60/049,575 entitled UNDER FLOOR LIFT filed Jun. 11, 1997 by the same Inventors. Applicants hereby claim the priority of this earlier filed Provisional Application pursuant to 35 U.S.C. § 119(e).

TECHNICAL FIELD

This application relates to Underfloor platform-type wheelchair lifts (UFL) for transfer of wheelchair users from ground level to the interior floor level of vehicles, more particularly to transit vehicles such as buses and trains. The UFL lift is of the telescoping, negative, in-swinging parallelogram type, and has a unique mechanism for preventing lateral sway and misalignment.

BACKGROUND ART

Wheelchair lifts for vehicles are three basic types: 1) floor mounted at the entry sill of a vehicle such as a side or rear door; 2) under floor lifts (UFL) which telescope outwardly from underneath the floor; and 3) under vehicle (frame) lifts (UVL).

The UVL lifts can be distinguished from the UFL, in that while both telescope outwardly from a horizontal stowage bay, the UVL under vehicle lift is located beneath the vehicle frame and must have motion including raising the platform from an intermediate stowage position upwardly to the floor level and downwardly to the ground level. In the UVL, the storage bay is substantially below the floor as it is suspended below the frame and/or axle of the vehicle rather than being above them as in the UFL type lifts.

In contrast, the UFL under floor lift does not lift above stowage level, as stowage takes place at the transfer level at or adjacent to the vehicle floor level. Typically both the UFL and UVL lifts have parallelogram or scissors type mechanisms to raise and lower the platform from the ground level up to the transfer level (the floor level of the vehicle) and, in the UVL, to move to an intermediate storage level.

The floor mounted lifts may be of a variety of types, including dual parallelogram, rotary lifts, and header types employing an inverted U assembly which is pivoted at its upper end, the arms of which carry the telescoping lifting arms. There are a few miscellaneous other types.

A particular problem with both the UVL and UFL type of lifts is that they must telescope beneath either the vehicle floor or its frame, and the lifting scissors or parallelogram must be collapsible and stowable in a relatively small vertical height in the order of 4 to 6 inches. Accordingly, these lifting members are subject to side sway as they drop down or lift. When a wheelchair user gets on the platform, he or she is often not centered. The added weight and motion of the chair on the platform can give rise to sway, which at the very least is disconcerting to the wheelchair user and in worst case situations can cause the mechanism to bind, experience accelerated wear, and possibly fail. This may be exacerbated by off-center location of the load on the platform, as when a vehicle loads or unloads a wheelchair user on an incline, either pointed up or downhill, or when the vehicle is canted to one side as where the roadway has a crown. In addition, the added weight of the wheelchair user on the platform typically causes the vehicle to tilt to that side.

In addition, these mechanisms are relatively complex and require trained service personnel. This puts a significant burden on the transit authority or school district. Accordingly, a lift with a solution to the lateral sway problem and a better lifting assembly would fill a long-felt need in the art.

THE INVENTION

SUMMARY, OBJECTS AND ADVANTAGES

This invention includes the following features, functions, objects and advantages in an improved under floor lift (UFL): Vastly improved lateral or sway stability, and an inboard safety barrier that actuates in relation to the positional movement of the lift platform and which forms a bridge plate at the upper transfer level; an improved UFL lift with smoother lifting and descent action than prior lifts, improved safety features, and which is less prone to maintenance and operational problems occasioned by lateral sway; functioning of the lift without having to raise the platform above its storage or transfer positions, permitting the parallelogram linkage to be an unpowered guide or slave linkage to simplify construction, maintenance and operation; a UFL that is more adaptable and useful in a wide variety of vehicles because the space required for lift mounting underneath the floor or framing is substantially less than in prior art lifts; and a UFL that is well adapted to installation, operation and storage in vehicles having a doorway step well, such as typical public transit buses. Other objects and advantages will be evident from the description, drawings and claims.

The under floor lift of the invention comprises a horizontal, U-shaped (in plan view) header framework which is mountable above a vehicle axle and below the floor, and which reciprocatingly receives a carriage comprising a second U-shaped framework. The carriage comprises a transverse motor mount plate or beam and a pair of spaced, horizontal arms (side rails) between which is received the lift platform. The platform is pivotably suspended and supported during lifting and lowering by spaced pairs of parallelogram linkages mounted at their top ends to the carriage ends. The force for platform lining and lowering is provided by a chain/hydraulic drive system.

The lift has a motion from an inboard stowed position horizontally out to a first transfer level deployed position in which an inclined inboard bridge plate provides the transition from the floor level of the vehicle to the lift platform. The wheelchair lift is then moved downwardly by virtue of the motion of the spaced parallelogram arms on either side of the lift platform to a ground level position. The links are pivotably secured at their outboard ends to the outboard end of the carriage slide rails and at their inboard ends to the inboard end of the lift platform. This permits the lift to be an in-swing, negative type lift providing most efficient operation and economy of design.

An automatic outboard roll stop is maintained in a generally vertical position during loading and descent to provide an outboard barrier against wheelchair roll off. In addition, during descent, the transitioning inboard bridge plate increases its angle of inclination (its outboard end descends), thereby forming an inboard barrier. The inboard bridge plate/barrier is mounted on C-shaped (in cross section) tubular sections which slide on steel rods or rails which are in turn mounted on a support plate pivotably mounted to the outboard edge of the motor mount plate of the carriage assembly.

The carriage assembly is mounted on rollers or bearings to move horizontally reciprocatingly (telescopingly) in the U-shaped horizontal mounting header frame. The combination of the barrier/bridge plate and the slider/support plate assembly provides excellent stability to the lift mechanism, essentially eliminating lateral sway and the problems attendant thereto.

The telescoping and lifting mechanism are, in a principal embodiment, chain driven, not only as to the reciprocating horizontal telescoping action of the carriage, but also with regard to the lifting and lowering action of the parallelogram linkage, and also the actuation of the outboard rollstop. The inboard barrier/bridge plate is slaved to the action of the platform lift or descent, and is accordingly automatic.

The under floor lift of this invention comprises the following principal sub-assemblies:

A. Header Frame

A horizontal, U-shaped (in plan view) header frame with two channel-section arms, which is mountable under the floor of the vehicle and above the axle thereof (i.e., the upper edges of the header being substantially at the transfer or vehicle floor level) with the frame arm ends extending somewhat outboard of the vehicle floor into the doorway or stairwell area. The open end of the header frame is oriented toward the side (or rear, in the case of a rear doorway) of the vehicle, and typically the arms are mounted generally parallel to the side walls of a step well and coordinates with the topmost riser of the step well;

B. Carriage Frame

A telescoping platform carriage or sliding frame, also generally U-shaped (in plan view) configuration which is mounted via rollers and button slides to nest in the U-shaped header frame A. The outboard end is open, as is the header frame. The inboard end of the carriage comprises a transverse box-like beam within which is mounted the primary components of the carriage drive motor/gear assembly E. This drive assembly provides the horizontal, reciprocating or telescoping motion of carriage frame B with respect to the header frame A, with the outer ends of the carriage frame members or arms being pivotably secured to the upper ends of the parallelogram linkage which supports the platform D below;

C. Bridge Plate Assembly

The platform bridge plate assembly comprises two interconnected and telescoping planar members. The first member is the bridge plate, which is conveniently and preferably a sheet of slotted steel or an X-met type steel member, and which is hinged at its outboard end to the inboard end of the floor of the platform D below. The second member is the brace plate or panel, formed of an appropriate thickness of metal plate or other structural material, preferably as an apertured frame or truss panel, and which is hinged at its inboard end to the transverse mounting beam of the carriage frame B above. These two plates preferably overlap, with the bridge plate above the brace plate. They are slidably interconnected by a slide means, preferably a pair of spaced-apart rails or rods mounted on the top surface of the brace plate and a mating slide or roller mechanism mounted on the underside of the bridge plate. In the principal embodiment, the brace plate has mounted on its top surface a pair of spaced guide rods or rails and the bridge plate has a pair of slide channels mounted on the underside which reciprocatingly and receivingly engage the rails or rods of the support plate so that, as the platform lifts upwardly and comes closer to the inboard edge of the top step of the step well, the two plates telescopingly overlap as the guide rails telescope into the slide channels until the bridge plate forms a generally horizontal (but gently upwardly sloped) continuation of the platform to permit the wheelchair user to roll off the platform onto the vehicle floor (or vice versa) to complete the transfer;

D. Platform

A platform assembly comprising a floor plate with side rails and two pairs of links pivotally secured to the inboard end of the platform side rails, which paired, spaced links form the parallelograms which are at their upper outboard end journaled to the outboard end of the carriage assembly arms. The platform is also generally supported adjacent its mid-point by a horizontal, under-platform support bar on which lifting chain rollers are mounted. The platform preferably includes foldable handrails and an outboard roll stop barrier that is automatically actuated from a lowered ramp position to a vertical stopped position at the initiation of the lifting cycle by the lifting chains tethered at one end to the rollstop;

E. Carriage Drive System

A carriage drive system, the principal components of which are located within the transverse mounting beam structure of the carriage frame B, comprising:

1) A drive motor/gearing assembly;

2) A jack shaft (driven by the motor/gearing assembly via a short transfer chain and sprocket pair), which spans the transverse width of the carriage transverse mounting beam to engage a pair of carriage drive chains by means of sprockets at each shaft end; and 3) A pair of carriage drive chains, a forward chain and a rear chain, located outside the carriage frame in the clearance space between the carriage frame and the header frame, each of which is tethered at an outboard end to one channel of the header frame and at the inboard end to the rear header plate to provide the telescoping action of deployment and stowage of the carriage frame, both directions of motion being by positive traction. These chains do not move, but serve as a fixed tethered "track" which the drive sprockets on the jack shaft engage and thereby drive or "walk" the carriage frame inwardly or outwardly with respect to the header frame during telescoping stowage and deployment, respectively; and F. Platform Lift Cylinder System A platform lift cylinder system, the principal components of which are located within the structure of the forward arm and transverse beam of the carriage frame B, comprising:

1) At least one hydraulic lifting cylinder mounted in at least one of the carriage arms, which cylinder has a yoke mounted on the outboard end of the cylinder rod, the yoke supporting multiple chain rollers or pulleys to engage and thereby pull or retract the lift chains;

2) A pair of lift chains, extending from on each side of the platform, up and around various guide pulleys located on the carriage frame, through the rollers or pulleys on the cylinder rod yoke, and thence to adjustable securement to the outboard end of the forward arm of the carriage assembly. The arrangement described provides for a mechanical advantage whereby the chain motion is double that of the cylinder rod movement. The rear chain (with respect to the vehicle orientation in a side mounted lift) extends back around the transverse mounting beam of the carriage frame before extending down to the transverse lifting bar of the platform. Both lifting chains are actuated simultaneously by the cylinder system to lift the platform from the ground level to the transfer level, while its reverse motion from the transfer level down to the ground (down-lift cycle) is an unpowered, gravity down motion upon cylinder release; and 3) In the preferred embodiment, the lift chains engage each end of the transverse lifting bar of the platform by means of a lifting roller mounted adjacent the bar end, rather than a fixed chain attachment, permitting the lift chain to extend around the lifting roller and thence forward (outboard) to terminate in an attachment to the hinged outboard roll stop barrier, thus providing automatic roll stop deployment at the beginning of the up-lift cycle whereby the lift chain pivots the stop upward to a latched closed (vertical) position as initial chain retraction begins, with further chain retraction causing the platform itself to be lifted upwards from ground level.

Lift Operation

The UFL of the invention has two principal phases of operation: the lift/descent phase, in which the platform is raised upwardly from the ground level to the transfer level and downwardly in the reverse motion; and the stowage/deployment phase, in which the platform and carriage, after handrail folding, are retracted into the header frame, thus being withdrawn under the vehicle floor, and extended in the reverse motion.

During the lift phase the bridge plate assembly serves three sequential functions: inboard roll stop at ground level and during lift motion; sway bracing during lift motion; and junction or bridge plate to mate the platform with vehicle floor at the transfer level. With the platform at ground level, the upwardly tilted bridge plate forms an inboard roll stop. As the platform begins to move upwardly upon the lift chains being retracted by the cylinder system, the bridge plate slides over the brace panel, maintaining a continuous connection between the bridge plate and brace panel which resists lateral swaying motion, but which leaves these components free to telescope as the guide rails slide into the channels, thus allowing free platform up-lift motion. The hinges of the bridge plate and brace panel to the platform and carriage frame respectively likewise maintain a continuous connection with the platform and carriage frame which resists lateral swaying motion while leaving the bridge plate assembly free to pivot towards a horizontal position as the platform swings through its lifting/lower arc and the inboard end of the platform approaches the outboard end of the carriage frame transverse beam.

The above-described interconnected bridge plate assembly is an important feature of the UFL of the invention, providing effective lateral bracing to the platform during platform motion. The fact that the UFL, of the invention is an inward swinging parallelogram lift with the platform swinging continuously inboard as it rises permits this continuous lateral sway support to be provided by a compact and efficient structure which also serves as a roll stop and transition bridge to the vehicle floor.

The guide rails can extend somewhat inboard of the brace panel and the transverse mounting beam can be notched to permit the rods to move arcuately down from an approximately 45° angle to a generally horizontal angle as the platform approaches the level of the floor of the vehicle. The bridge plate merges to (abuts), or overlaps, a transition plate on the top of the transverse mounting beam of the carriage frame so that there is a continuous and smooth transition from the platform floor to the vehicle floor.

Another important aspect of the invention lies in providing the platform floor to be inclined slightly upwardly from its outboard end toward its inboard end. In addition, the angle of the bridge plate/support plate sub-assembly in its transfer position is designed so that there is a continuation of the same angle (as the platform floor) up to the vehicle floor. This permits the lift to function without having to raise the platform above the side rails of the telescoping carriage assembly. As a result, this permits the parallelogram linkage to be an unpowered guide or slave linkage, as it does no lifting. Thus, the lift of this invention always remains negative, in that it only lifts as high as its horizontal stowage position. Conversely, lifting above stowage position, as in a UVL, is termed "positive". In addition to objective operational benefits, the inward rising motion of the platform increases passenger subjective feelings of security by minimizing the height of the platform travel above the ground during motion and, in a bus stair well installation, by assuring that the platform approaches full vehicle floor height only as it enters the partially enclosed stairwell volume.

In the UFL of this invention, the side beams of the lift platform can, but preferably do not, extend above the top edge of the side arms of the carriage sub-assembly, and once the user has departed from the platform, the lift is then ready for immediate horizontal retraction (stowage) movement into the stowage bay position under the floor. This also permits the lift to be mounted immediately under the floor in a more compact arrangement. That is, this lift becomes more adaptable and useful in a wide variety of vehicles because the space required for lift mounting between the underneath of the floor and the framing can be substantially less than in prior lifts.

Still another feature of the present invention is that the unpowered parallelogram linkage is pivoted at both ends, from the outboard end of the carriage assembly side arms to the inboard end of the platform. Thus, as the platform lifts, its inboard end always approaches (comes closer) to the vehicle. (In contrast, a UVL has arcuate travel that swings away from the vehicle in its initial travel, typically up to about stowage level, before coming back in toward the vehicle.) Having a lift that approaches the vehicle continuously is important because of the typical presence of a step well. Typically, transit vehicles have a step well which is two or three steps high because the floor clearance to ground is on the order to 20–40". In order to provide an interior step well, the steps must be recessed into the interior of the vehicle. The UFL of this invention is mounted at the riser of the top step so that it can be a negative clearance lift. Were it mounted at the riser of the lower step, it would have to be positive, and would have to move (above stowage level) inwardly over center to meet the floor. In contrast, by pivoting the parallelogram linkages between the outboard end of the side rails of the carrier assembly and the inboard end of the platform, a negative, in-swing lift motion is provided.

Still another feature of the invention is that the platform is lifted essentially from its center by suspending it on a strong cross member spanning beneath the flooring of the platform. Since the platform floor is canted upwardly from outboard to inboard end, there is some clearance for this member. Thus, the under-platform lift bar does not present a barrier or a bump over which the wheelchair user must pass. That is, the lift floor is one continuous plane. In addition, a pair of hand rails, foot barrier or padded leg barriers may be provided on the outboard ends of each of the platform side rails. These may be either manually locked and released with a simple, vertically reciprocating locking pin, to be folded (transversely or longitudinally) down out of position, or may be automatically actuated by gas or torsion springs, chain drives, linear actuator(s) or hydraulic drive mechanisms as desired. Alternately, they may pivot from transverse position during lift/descent to parallel-to-platform-sides upon ground contact by a spiral sleeve cam and follower pin mechanism.

The UFL of the invention may include a barrier, such as a rollstop, mounted adjacent the outboard end of said platform.

The UFL of the invention may include handrails mounted to said platform. The hand rails may be collapsible toward the floor of said platform.

The UFL of the invention may include barrier rails mounted adjacent the outboard end of said platform. The barrier rails may be pivotable from transversely across the lift platform to parallel to the side rails, the transverse orientation occurring when the lift platform is out of ground contact and the parallel orientation occurs when the platform makes contact with the ground. The barrier rails may be collapsible toward the floor of the platform. The barrier rails may be selected from handrails, foot barriers, lower leg barriers, and torso barriers.

The connections to the hydraulic lift cylinder and electrical wiring to the transverse storage/deploy drive motor are conventional in the art. A variety of control mechanisms may be employed. For example, the control can be provided at the end of an umbilical cord with a hand held control switch box. Or the entire lift can be controlled from the vehicle driver's seat, or from an exterior panel adjacent to the stair well door, or remotely by RF or IR transmitters.

When the UFL platform is completely stowed, the stair well surfaces are completely flush. That is, the lift completely disappears, with the outboard face of the outboard roll stop forming the vertical riser of the top step of the stair well. The side steps and risers of the stair well are completely smooth and flush with no projections. A commercially available standard bi-fold or parallelogram-type door may be used at the vehicle entry. While the lift is shown as mounted transversely in a vehicle, just behind the right front quadrant, it should be understood that it can be mounted just behind the left front quadrant for certain European countries and Japan where they drive on the left side of the road. Still further, it can be mounted in the rear of the vehicle. The lift may also be used for utility or industrial vehicles, or may be installed in buildings, transfer stations or other facilities and the like.

Still another feature of the invention is the easy maintenance and change out. Since the entire lift is housed in a sliding carriage assembly, if it malfunctions, the hydraulic and electrical lines are disconnected and the drive chain is disengaged, whereupon the entire lifting assembly can be removed by sliding out the carriage assembly. A replacement can be slid in place, and the vehicle ready to go in short order as part of a replace and repair program.

The bridge plate/support plate and slide system prevents lateral sway of the platform during lifting and descent. This vastly improves the stability of the lifting assembly and reduces both wear and maintenance problems. This is a significant step forward in the art as the inboard end of the platform is now continuously slidably linked to the carriage and header assembly providing improved stability in all actions of motion as well as smoothness of lift. This translates to much greater reliability, longer life for the lift, reduced maintenance and a heightened sense of security for the wheelchair-bound user.

The UFL of the invention may be adapted to vehicles of a range of body types and sizes. Although the example of the principal embodiment described in detail is for a public transit-type bus, the UFL is suitable for rear loading buses and vans, and may be adapted for mini-vans, sport utility vehicles and pickup trucks.

BRIEF DESCRIPTION OF DRAWINGS

The invention is described in more detail in the accompanying drawings, in which:

FIG. 4 shows the anti-sway bridge plate sub-assembly in greater detail in an isometric view in the same orientation as in FIG. 1, showing particular aspects of the best mode of the UFL of the invention;

FIG. 5 is a cross section view of a portion of the bridge plate assembly illustrating the telescoping engagement and mounting of the guide rails and slide channels;

FIGS. 6A and 6B being side elevation section views of the front carriage arm showing the mechanical arrangement of the lift cylinder and lift chains, and FIG. 6C being a plan view of the carriage frame B showing additional elements of the carriage drive system E;

FIG. 7 is an isometric view of the UFL of the principal embodiment of the invention in the same orientation as in FIG. 1, but with the platform raised to the transfer level;

FIG. 8 is a side elevation section view of the fully telescoped bridge plate assembly together with portions of the header frame, carriage frame and platform in the UFL transfer level configuration, showing more particularly the mating of the bridge plate with the transition strip and vehicle floor.

FIG. 9 is a side elevation section view showing schematically the drive chain arrangement and the telescoping mounting of the carriage frame within the header frame A;

FIG. 10 is an isometric view of the UFL of the principal embodiment of the invention in the same orientation as in FIGS. 1 and 7, but with the platform assembly and carriage frame retracted to the stowage position under the vehicle floor; and FIG. 11 shows pivotable barrier rails mounted on the UFL platform.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believe to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

Figure 1:
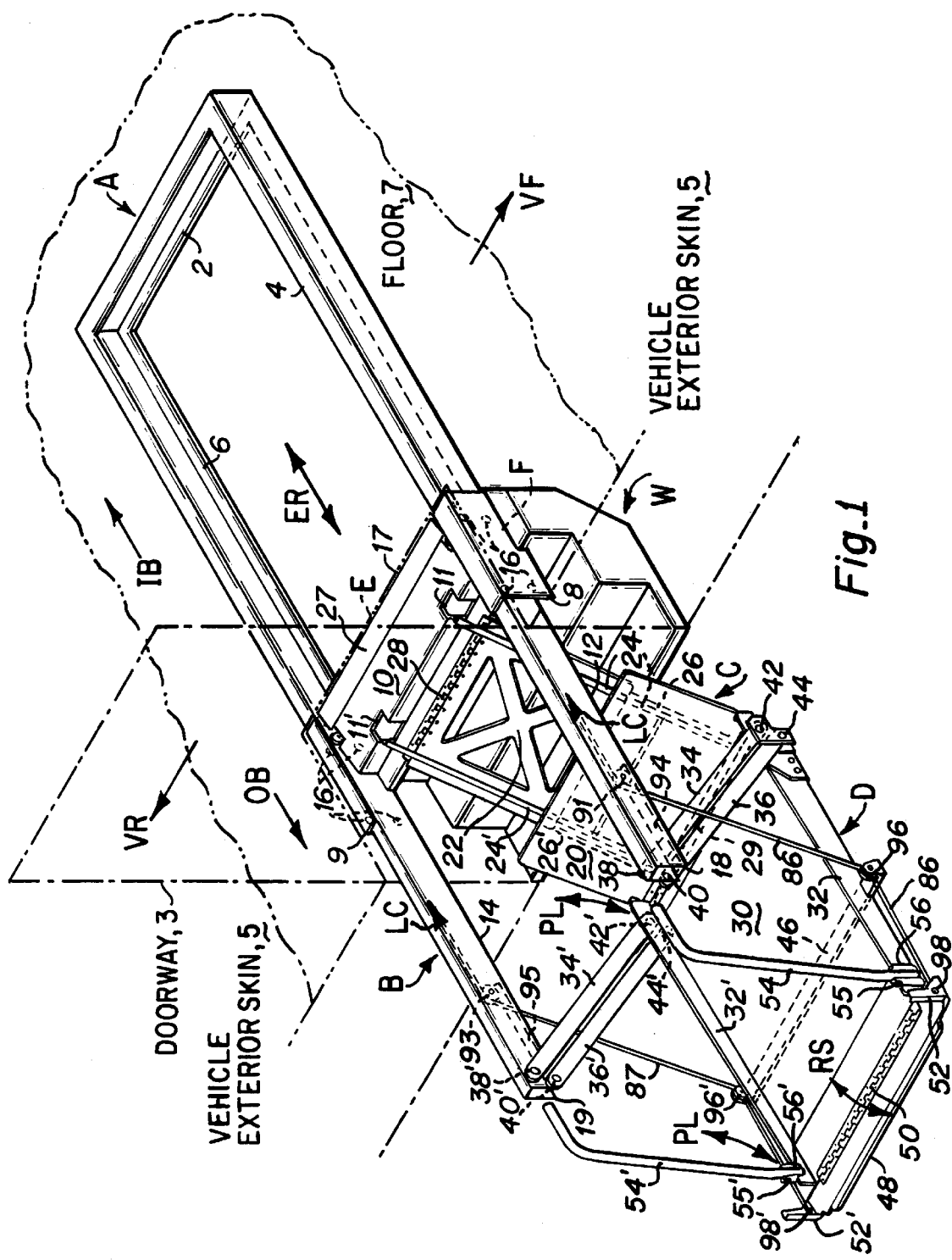
FIG. 1 shows an simplified isometric view of the current best mode of the UFL of this invention as mounted at the top of a bus-type step well (vehicle not shown), the lift being shown fully extended and lowered to the ground position, with many conventional production details being omitted for clarity.

FIG. 1 shows an isometric view of the UFL of the principal embodiment of this invention in simplified form showing the relationship of the major sub-assemblies. In this figure a number of structural details of the current best mode are omitted to more clearly illustrate the principles of the invention. The view represents a mounting on the right side of a vehicle with the vehicle forward and vehicle rearward directions being indicated by Arrows VF and VR, respectively. Other UFL mounting orientations are feasible, although the one shown is typical of public transit bus installations. The vehicle right side outboard direction is indicated by Arrow OB and the inboard direction (towards the vehicle longitudinal centerline from the right) is indicated by Arrow IB. The UFL is shown as mounted at the top of a bus-type step well W, including the header frame A fixedly mounted to the vehicle below the vehicle floor; the carriage assembly B; the bridge plate assembly C; the platform assembly D with the platform being shown fully extended and lowered to the ground position. The doorway 3, vehicle outer skin 5 and floor 7 are shown in phantom.

In the upper right-hand portion of FIG. 1 is the header frame A, comprising the inboard header plate 2, which is joined at its forward and rear ends to forward header channel 4, and rear header channel 6 respectively. These components are rigidly joined at right angles with the channels parallel to form a horizontally disposed U-shaped frame with the inboard plate 2 being the base of the "U", the channels 4, 6 being the sides and the open end of the "U" facing outboard towards the stairwell W. The header channels are C-shaped in cross section, with the opening facing towards the inside of the U-shaped header frame. The header frame is shown with the forward and rear side channel ends extending outboard into the stairwell area W, with the main portion of the header frame being positioned immediately under the vehicle floor. Many of the components of the UFL embodiment shown, including the platform and bridge plate assemblies, are substantially symmetrically disposed about a vertical plane parallel to and spaced midway between the header frame channels 4, 6, and this plane is referred to herein as the "centerline" C/L of the UFL and of the corresponding assemblies. For simplicity and clarity corresponding parts on each side of the centerline may be referred to by the same label numbers. Arrow ER is shows the carriage extension/retraction (stowage/deployment) direction of motion.

Carriage frame B is shown partially housed within the header frame channels and extends outboard from the channel ends 8, 9 (in the deployed configuration shown). The carriage frame comprises transverse drive-mounting beam 10, forward carriage arm 12 and rear carriage arm 14 joined rigidly at right angles, with the arms parallel, to form a second horizontally disposed U-shaped frame with the open end of the "U" facing outboard from the stairwell in a co-planar nested orientation within the header frame A. The forward and rear arms 12, 14 and transverse mounting beam 10 are of are preferably of square or box-beam section with openings or slots 94, 95 on the undersides adjacent the outboard arm ends 18, 19 to allow passage of the forward and rear lift chains 86, 87 as discussed below. Alternatively the arms may also be of channel or other section of sufficient strength. In the principal embodiment, the inboard portion of the arms are formed with box cross-sections and the outboard ends are formed as channel sections, with the slots 94, 95 comprising the open underside of the channel section. The width of the carriage frame (forward to rear dimension at the outside of the arms) is slightly less than the width of the header frame, and likewise the height of the carriage frame is also slightly less than that of the header frame, so as to permit the carriage frame clearance to telescopingly slide (nest) within the channels of the header frame. There is a sufficient clearance space on each side of the carriage arms between the sides of the arms and the inner surface of the header frame channels to permit the installation and operation of the carriage drive chains and sprockets (74 and 70, respectively in FIG. 7, discussed below).

The carriage frame B is supported by a plurality of carriage support rollers 16 (and/or alternatively button slides) which are rotatably mounted on the carriage frame arms 12, 14 and which bear upon the upper and lower inner surfaces of the header frame channels to permit inboard and outboard motion of the carriage frame relative to the header frame, indicated as the carriage extension/retraction motion by Arrow ER Additional rollers or slides (not shown) may be mounted on the carriage frame and/or header frame to bear horizontally on the forward and rear inner surfaces of the channels 4, 6 or carriage arms 12, 14 respectively to maintain lateral alignment of the carriage frame as it telescopes in or out of the header frame. The carriage frame B, and particularly the transverse mounting beam 10, contains within its structure the principal components of the carriage drive system E, discussed further below. This system provides power to drive the extension/retraction telescoping motion of the carriage frame. In addition, the forward carriage arm 12 contains within its structure the principal components of platform lift cylinder system F, discussed further below. This system provides the power and control to lift the platform D from the ground level to the transfer level, and this system also controls the gravity-powered descent of the platform from transfer level to ground level.

The carriage and header frames are preferably constructed of steel sections and formed sheet joined by welding, bolts, rivets and/or other suitable fastening or bonding means. Other suitable structural materials may be used, including aluminum, composites, bonded skin/core sandwich-type plates, and the like. The platform assembly and bridge plate assembly may be constructed of generally similar materials and fastening means.

Figure 2:
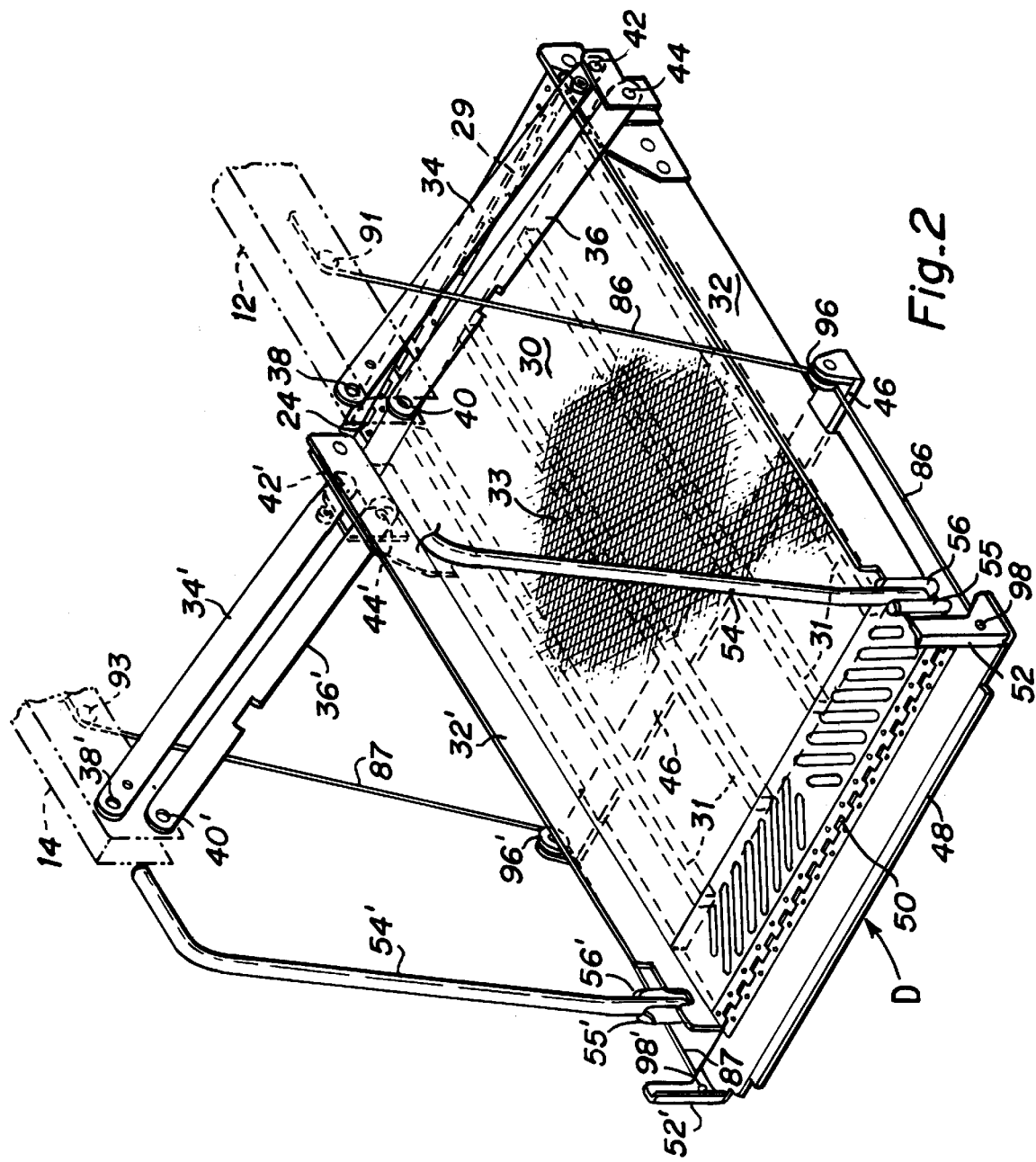
FIG. 2 is a detailed isometric view of the platform assembly of the UFL of FIG. 1 in the same orientation as in FIG. 1, showing particular aspects of the parallelogram linkage.
Figure 3:
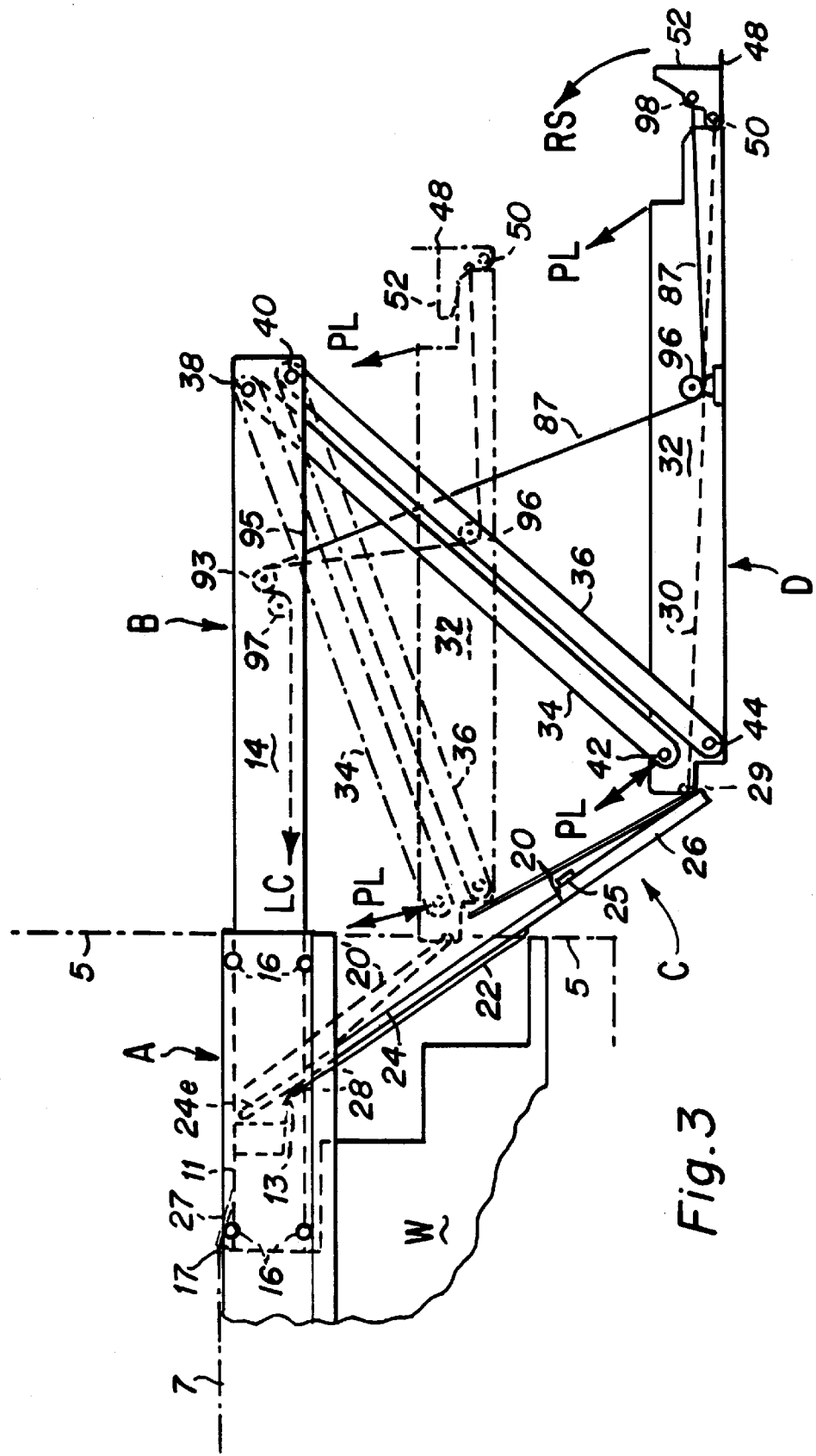
FIG. 3 is an simplified elevation view of a portion of the UFL including the platform assembly at ground level, shown as seen from rearward of the UFL looking forward, and including an additional phantom view of the platform assembly in a partially lifted position intermediate between the ground level and the transfer level.

The platform assembly is shown in the lower left of FIG. 1, and is also shown in FIG. 2 and FIG. 3. FIG. 2 is a detailed isometric view of the platform assembly alone in the same orientation as in FIG. 1, showing particular aspects of the best mode of the UFL of the invention. The platform assembly D comprises a horizontal rectangular platform floor 30 bounded by forward and rear side beams 32, 32' respectively, rigidly joined to the forward and rear edges of the platform floor. The platform floor is preferably constructed of steel framework covered with a non-slip steel mesh, such as X-met or the like, although other suitable structural materials may be used, including aluminum, composites, skin/core sandwich-type plates, and the like. The platform assembly is supported from the outboard portion of the forward and rear arms 18, 19 of the carriage frame B by a forward and a rear pair of pivotably mounted parallelogram links. The links comprise forward upper and lower parallelogram links 34, 36 mounted to the carriage forward arm end 18 by upper and lower arm pivots 38, 40 respectively; and rear upper and lower parallelogram links 34', 36' mounted to the carriage rear arm end 19 by upper and lower arm pivots 38', 40' respectively. These pairs of parallelogram links are pivotably mounted to the inboard ends of the platform side beams 32, 32' by pairs of upper and lower platform pivots 42, 44 and 42', 44' respectively. While in the best mode embodiment shown in FIGS. 1 and 2 the links are unpowered, the invention contemplates powered or driven links. By the term "unpowered" it is meant that no hydraulic cylinder, actuator, or other driven member is attached directly to any on of the links or their pivot connections.

The roll stop 48 is mounted to the outboard edge of the platform floor 30 by means of roll stop hinge 50, and a pair of roll stop latch plates 52, 52' fixed to the forward and rear ends of the roll stop. A pair of foldable handrails 54, 54' are pivotably and lockably mounted to a corresponding pair of hand rail brackets 56, 56' which are fixed to the outboard ends of the platform side beams 32, 32'. The handrails may be folded down inwardly towards the platform centerline, upon release of the handrail locking pins 55, 55' prior to UFL stowage.

Platform lift beam or bar 46 spans beneath, and is fixed to, the platform floor 30 perpendicularly between platform side beams at a point near or somewhat outboard the platform center (with respect to platform inboard/outboard length), extending slightly forward and rearward of the sides of the platform. The function of the lift beam 46 is to transmit and distribute the forces applied by the platform lift cylinder system F to the platform structure. The platform lift cylinder system applies lifting force to the platform by means of the forward and rear lift chains 86, 87 which descend, in the platform-at-ground-level configuration shown in FIG. 1, at an angle of about 25° from the vertical from the forward and rear lift rollers 92, 93 respectively. The lift rollers are rotatably mounted within the carriage arms 12, 14 near the outboard arm ends 18, 19. The forward and rear lift chains 86, 87 pass through lift chain slots 94, 95 on the undersides of the each arm to engage the forward and rear lift rollers respectively. The chain slots may formed as discrete openings in a box beam or the outer portion of the arms may be formed as an inverted channel section with the section opening facing downward. The lift chains pass from the lift rollers to the internal components of the platform lift cylinder system F (discussed further below) in the chain retraction or pull direction as indicated by Arrow LC.

In the principal embodiment shown, the lift chains serve to automatically close and latch the outboard roll stop 48 in addition to their primary function of lifting the platform. For this purpose, the forward and rear lift chains 87, 86 transmit force to the lift beam by engaging forward and rear platform chain rollers 96, 96' respectively which are rotatably mounted to the ends of the lift beam 46. The lift chains pass around the underside of the platform chain rollers and continue outboard to attach to the forward and rear roll stop latch plates 52, 52' respectively by means of a pair of platform chain attachment pivots 98, 98' mounted on the roll stop latch plates adjacent to, but slightly above, the roll stop hinge line 50. This placement of the chain attachment pivot above the hinge line provides that, as the lift chains are retracted into the interior of the carriage arms as indicated by Arrow LC, the roll stop 48 is first caused to rotate upwardly to a closed position in the direction indicated by Arrow RS as the lift chains moves around platform chain rollers 96, 96' until the roll stop abuts the platform side beams and further rotation of the roll stop is prevented, leaving the roll stop in a vertical closed or latched position. The phantom view of the platform in FIG. 3 shows the roll stop in its closed position. Thereafter following roll stop closure, further movement of the lift chain with respect to the platform chain rollers ceases and the chain rollers serve as fixed points of application to the lifting forces on the platform.

Alternatively, the roll stop may be closed and latched by means independent of the lift chains, such as a manual closing lever and latch, or gas spring in which case the platform chain attachment pivots 98, 98' may be mounted directly to the ends of lift beam 46 and the platform chain rollers 96, 96' may be dispensed with.

As shown in FIG. 2, the platform floor 30 slopes gently upwards from outboard to inboard, permitting the platform structure to be level and flush with the carriage frame when the UFL transfer level is reached, the slope of the floor allowing the wheelchair to proceed inboard across the bridge plate to the vehicle floor. The platform is thus ready to be retracted with the carriage frame for stowage without further lifting or descent. FIG. 2 also shows the referred non-slip type mesh upper surface 33 of the best mode of the UFL of the invention. The floor structure in this embodiment incorporates floor support stiffeners 31.

FIG. 3 is a simplified elevation of a portion of the UFL including the platform assembly at ground level, shown as seen from rearward of the UFL looking forward and including an additional phantom view of platform assembly in partially lifted to a position intermediate to the ground level and the transfer level (the vehicle is omitted from FIG. 3 for clarity). The structure and operation of the forward side of the platform assembly and the corresponding forward parallelogram linkage is essentially identical, and is not separately shown. The phantom line 5 is the outer right side of the bus and 7 is the floor level. As shown in FIG. 1 and more particularly in FIG. 3, following roll stop closure, further movement of the lift chain with respect to the platform chain rollers ceases and the chain rollers 96, 96' serve as fixed points of application of the lifting forces to the platform. Continued retraction of the lift chains into the carriage arms in the direction of Arrow LC causes the platform to be lifted upwardly from the ground level through an arcuate path indicated by Arrows PL. The arc of platform motion is controlled by the geometry of the parallelogram linkage described above, and the platform maintains a horizontal orientation as it swings up between the carriage arms towards the fully lifted transfer position. The bridge plate assembly spans the gap between the inboard end deft side in FIG. 3) of the platform to the top riser 17 of the stepwell W. With the platform at ground level, the bridge plate 20 is inclined upwards at a steep angle, forming the inboard roll stop. As can be seen in the phantom view, as the platform is raised, the bridge plate 20 telescopes along the guide rails 24 and over the brace panel 22 to approach the upper edge of the transverse beam 10, while rotating to a smaller angle of inclination (20' in phantom) about hinge axis 29 (the brace panel 22 and guide rails 24 simultaneously rotate in a coordinated fashion about hinge axis 28). As the platform approaches the transfer level (adjacent to vehicle floor level) the bridge plate continues this rotation towards a horizontal orientation and rides over the upper edge to the transverse beam 10 to cover the upper surface of the transverse beam and meet the edge of the vehicle floor 7 at the top riser 17 of stairwell W.

The bridge plate assembly is shown in FIG. 1 as installed in the UFL and located between the platform assembly and the transverse beam of the carriage frame. Also, FIG. 4 shows the bridge plate assembly in greater detail, being an isometric view of the bridge plate assembly alone in the same orientation as in FIG. 1, showing particular aspects of the best mode of the UFL of the invention. Portions of the carriage frame B and platform D are shown in phantom view, connected to the bridge plate assemble at hinge axes 28 and 29 respectively The bridge plate assembly C comprises the bridge plate 20 which is pivotally connected to the inboard edge of the platform floor 30 by bridge plate hinge 29 which is preferably a continuous hinge, such as a piano-type hinge, forming a continuous hinge axis parallel and adjacent to the in board edge of the platform floor. The sway brace panel 22 is pivotally connected to the outboard upper edge of the transverse beam 10 of the carriage by the brace panel hinge 28, which has a hinge axis running parallel to the bridge plate hinge and also is preferably a continuous hinge. A pair of guide rails 24, 24' are spaced apart on each side of the UFL centerline between the carriage frame arms and are mounted to the upper face of the brace panel 22. A correspondingly spaced pair of slide channels 26, 26' are mounted to the underside of the bridge plate 20, each of the slide channels being disposed co-axially with, and telescopingly engaging into, the corresponding guide rail 24, 24'.

In the principal embodiment shown, the slide channels are mounted to a rigid spacing frame 25 which is in turn mounted to the underside of the bridge plate. The spacing frame 25 is fixedly joined to the slide channels and the bridge plate at a location adjacent to the upper end of the slide channels, and also joined to the bridge plate adjacent or at hinge axis 29. By selection of the depth and inboard-to-outboard tapered shape of the spacing frame 25, the inboard edge 15 of the bridge plate 20 is held above the slide channel 26 by a predetermined distance, thus adjusting the mounting angle between the slide channel and the bridge plate. This adjustment serves to fix the clearance between the bridge plate and the brace panel to a distance which permits the bridge plate to mate smoothly with the vehicle floor as the bridge plate assembly telescopes inward and upward as the UFL platform moves upwardly to the transfer level. As the lift rises to the position of FIG. 7 the projecting upper ends of the rails 24e and 24e' recess into slots or cutouts 11 and 11' in the carriage transverse beam 10, respectively, and the inboard edge 15 of the bridge plate 20 mates to or underlaps slightly the floor 7 at the stepwell top riser location 17. Alternatively the slide channels can have an integrally formed mounting plate of selected taper which mounts directly to the bridge plate and likewise adjusts the mounting angle.

As seen in FIG. 4, with the platform at ground level there is preferably some overlap between the bridge plate 20 and the brace panel 22 with the brace panel extending downward to a point adjacent to the upper ends of the slide channels 26 on bridge plate 20. The guide rails, which are fastened to panel 22, extend beyond the lower margin of the brace panel a sufficient length to be securely engaged within the slide channels 26 when the bridge plate assembly is telescoped open (outwardly) to its greatest operational extent as the platform is lowered to ground level. The slide channels are open at the lower end so that the lower ends of the guide rails emerge beyond (outwardly of) the bridge plate hinge line as the bridge plate assembly is telescopingly closed (inwardly) to its greatest operational extent as the UFL, platform is raised to the transfer level. The guide rails (24e and 24e') may extend beyond the inboard end of the brace panel 22 (upwardly and towards the left in FIG. 4) to ensure that the rails remain securely engaged within the slide channels 26 when the platform is at the transfer level and the bridge plate 20 has moved to its most inboard position to mate with the vehicle floor.

FIG. 5 shows schematically a cross section of a portion of the bridge plate assembly more particularly illustrating the telescoping engagement and mounting of the guide rails and slide channels. A guide rail 24 is mounted, by bolts or threaded fasteners 23 or other suitable fastening means, to the upper face of the brace panel 22. A slide channel 26 is mounted in like manner by threaded fasteners 23 to spacing frame 25 which is in turn fixedly mounted to the to the lower face of the bridge plate 20, preferably by a plurality of filet welds 37. Although the spacing frame 25 is shown as a solid spacer, this is preferably constructed as an rigid open framework, to save weight and material. The slide channel 26 partially surrounds the guide rail. In the principal embodiment the guide rails 24 are of circular section. The slide channel side 21 is a partially open circular "C" shaped section with the open side of the slide channel facing downward. The inside of the slide channel has a diameter slightly larger than that of the guide rails to permit sliding clearance between these telescoping components. In cross section, the slide channel sides extend in depth substantially more than a semi-circle so that the channel side opening is narrower than the diameter of the guide rail, thus maintaining the connection between bridge plate and brace panel by preventing the guide rail from disengaging the slide channel, while leaving the guide rail and slide channel free to slide or telescope longitudinally. However, channel sides 21 are limited in depth sufficiently to provide clearance between the slide channel and the upper surface of brace panel 22.

Figure 6A:
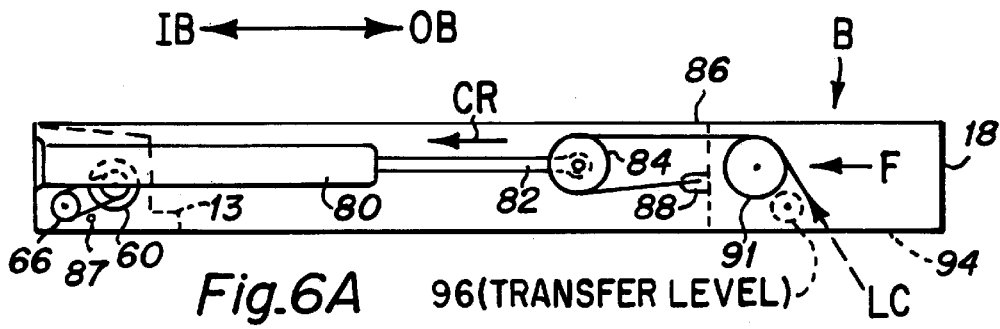
FIGS. 6A, B and C show the portions of the platform lift cylinder system F and the carriage drive system E which are housed within the carriage frame B.
Figure 6B:
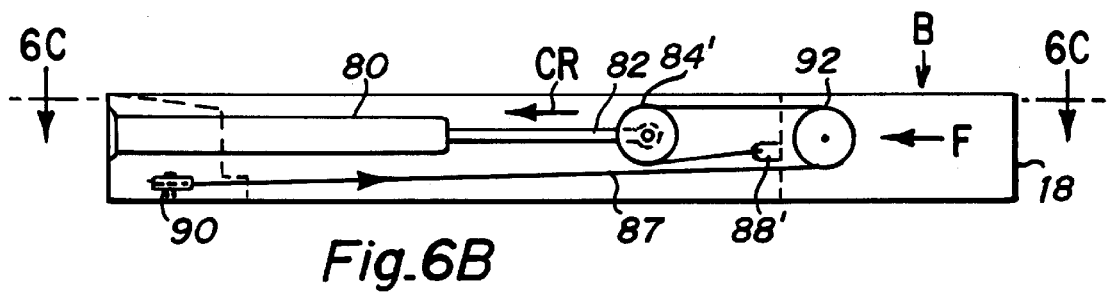
Figure 6C:
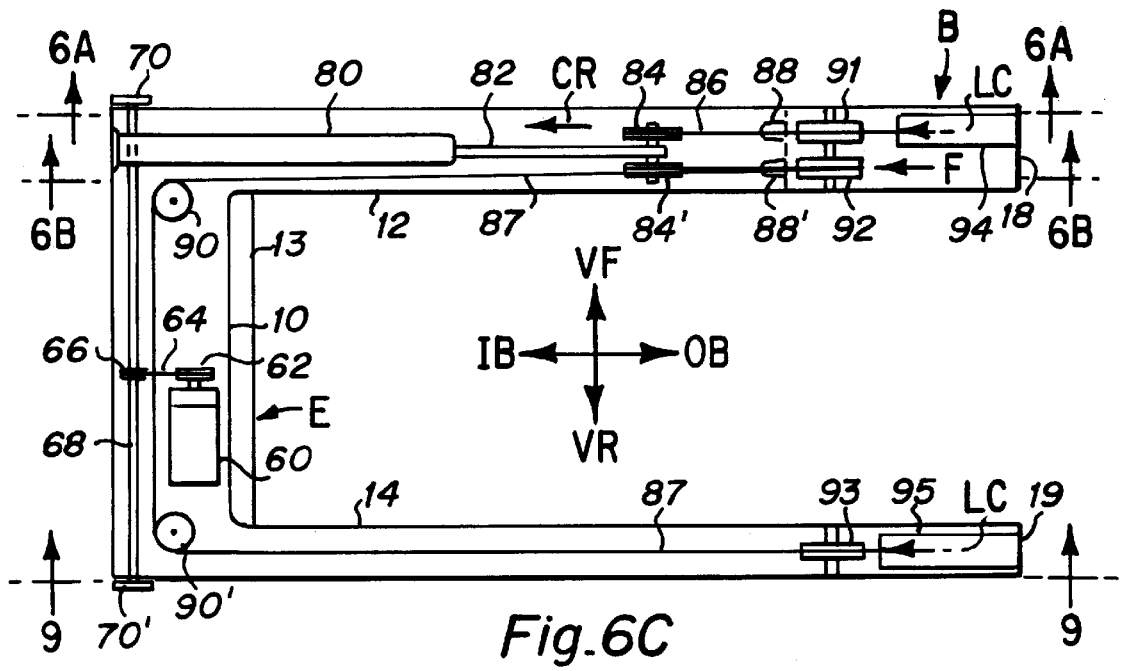

FIGS. 6A, B and C depicts, in simplified form, the platform lift cylinder system F which is housed within the carriage frame B. The header frame, platform and the bridge plate assembly are omitted for clarity. Some of the elements of the system are shown enlarged relative to others to clarify the mechanical relationships. FIGS. 6A and 6B are section views as seen from just inside the side surfaces of the front carriage arm 12 along lines 6A—6A and 6B—6B respectively in FIG. 6C, the figures showing the mechanical arrangement of the lift cylinder 80, and the forward and rear lift chains, 86 and 87 respectively. FIG. 6C is a plan view of the carriage frame B as seen from just inside the upper surface of the carriage frame along line 6C—6C in FIG. 6B looking downwardly. FIG. 6C also shows elements of the carriage drive system E, discussed below. In each figure the hydraulic lift cylinder 80 is shown mounted to the structure of the forward carriage arm 12 oriented longitudinally along the approximate centerline of the arm, with the piston rod 82 extending outboard from the cylinder. The piston double chain rollers 84, 84' are rotatably mounted to the outboard end of the piston rod, with one roller disposed on each side of the piston rod with the rollers arranged to rotate in a vertical plane aligned with the centerline of the arm. A yoke mount is preferred for the rollers 84, 84'.

FIG. 6A shows the forward lift chain 86 fixed at one end to lift chain attachment bracket 88. The forward chain leads therefrom inboard to engage the underedge of the rim of piston chain roller 84, turning approximately 180° around the roller and leading therefrom outboard to engage the upper rim of the forward lift roller 91, which is mounted adjacent the outboard end 18 of the forward carriage arm 12. The forward chain 86 then leads around the forward lift roller through an angle ranging from about 60° to 90° (the angle varies with the position or level of the platform) to lead in a downward and generally outboard direction through forward chain slot 94 in the lower surface of the carriage arm. The lift chain then leads (shown as Arrow LC in FIG. 6) to the platform to engage the forward platform chain roller (96 in FIGS. 1, 2 and 3). As can be best seen in FIG. 3, the angle of descent of the lift chain to the platform roller 96 become progressively more vertical as the platform is raised. This geometry of the parallelogram linkage permits the platform to be raised until the platform rollers 96, 96' are pulled into the lift chain slots 94, 95 to nest adjacent to the lift rollers 91, 93 (compare FIGS. 1 and 6A).

FIG. 6B shows that the mechanical arrangement for the rear lift chain in forward carriage arm 12, which is generally similar to that of the forward chain, except for the elements required to transfer the platform lifting point of action to the rear carriage arm. The rear lift chain 87 fixed at one end to lift chain attachment bracket 88' and leads therefrom inboard to engage the lower rim of piston roller 84', turning approximately 180° around the roller and leading therefrom outboard to engage the upper rim of the intermediate roller 92, which is mounted coaxially with forward lift roller 91. However, unlike the arrangement to the forward lift chain, the rear lift chain is turned approximately 180° around the intermediate roller and leads therefrom inboard to engage the forward rim of a first transfer roller 90. As best seen in FIG. 6C, the first transfer roller 90 is rotatably mounted in a horizontal plane within the carriage frame adjacent the junction to the forward carriage arm 12 and the transfer beam 10. The rear chain 87 is then turned 90° around the first transfer roller and leads transversely across the transverse beam 10 to engage a second transfer roller 90', mounted adjacent the junction of the transverse beam 10 and the rear carriage arm 14. The rear chain 87 is then turned 90° around the second transfer roller 90' to lead outboard to engage the upper rim of the rear lift roller 93. The rear lift chain then turns through an angle ranging from about 60° to 90° to lead downward and outboard through rear chain slot 95 in the lower surface of the rear carriage arm 14 to the rear platform roller (96' in FIGS. 2) as shown as Arrow LC in FIG. 6C. As shown in FIG. 3, an additional alignment roller 97 is mounted in the principal embodiment adjacent to and beneath the rear lift roller 93 engaging the rear lift chain by means of it lower rim, thereby controlling the alignment and engagement of the lift chain with the rear lift roller.

The link structure of the platform lift chains 86, 87 allows the line of force of the chains to be turned efficiently through relatively small radii at the various chain rollers, promoting the compact form of the platform lift system which permits underfloor stowage in the height of a single stair riser. It should be noted that the portions of the lift chains which do not pass through the lift or piston rollers (84, 91, 92, and 93 in FIG. 6) may alternatively consist of suitable cables and cable-to-chain connectors rather chain links, or a cable/pulley system may be employed as an alternative to the chain/chain roller system.

The use of a single lift cylinder 80 to simultaneously actuate both forward and rear lift chains 86, 87 provides balanced, controllable and uniform lifting action to both forward and rear sides of the platform assembly. The longitudinal orientation of the lift cylinder in the carriage arm 12 makes efficient use of available space and permits the use of a relatively long piston throw and a simple, compact chain/roller system with a 1:2 mechanical advantage to obtain a sufficient range of chain retraction to raise the platform. However, the hydraulic cylinder may alternatively be mounted in the rear carriage arm, or may be disposed transversely in the transverse carriage beam. In addition, dual cylinders or alternative types of linear actuators or winches may be employed.

FIG. 7 is an isometric view of the UFL of the principal embodiment of the invention in the same orientation as in FIG. 1, but with the platform raised to the transfer level, and showing the inboard end 15 of bridge plate 20 mated to the transition strip 27 which in turn slopes up to the floor lever 7 at edge 17. See also FIG. 8. FIG. 8 is a side elevation section view along line 8—8 in FIG. 7 of the fully telescoped bridge plate assembly together with portions of the header frame, carriage frame and platform in the UFL transfer level configuration, showing more particularly the mating of the bridge plate 20 with the transition strip 27 and vehicle floor 7. See also FIG. 6A. In comparison with FIG. 1, in FIG. 7 the platform rollers 96, 96' have been raised by retraction of the lift chain until they nest adjacent to the corresponding forward and rear lift rollers 91, 93. This permits the platform to be fully raised to nest between the forward and rear carriage arm 12, 14 with the platform side beams 32, 32' neither projecting above or below the carriage arms. As can also be seen in FIG. 8, the bridge plate 20 has rotated to more nearly horizontal, so that it forms a gently sloping ramp from the platform floor inboard edge upwards to the vehicle floorline 7, covering the major portion of transverse beam 10 of the carriage frame B to about the transition strip 27 mounted adjacent the inboard edge of beam 10. Thus, the UFL is in position for the wheel chair occupant exit the platform and move onto the vehicle floor (or alternatively, to enter the platform in preparation for lowering to ground level).

Note that the parallelogram links 34, 36 (and 34', 36') have pivoted to lie parallel to the side beams in the space between the side beams and the carriage arms. Shown as hidden lines in FIG. 7, the brace panel 22 and the guide rails 24, 24' have also rotated in co-ordination with the bridge plate, telescoping along the slide channels 26, 26' to lie nested underneath the platform floor 30 in the space provided by the upwardly sloped floor. As shown more clearly in FIG. 8, the taper angle of the spacing frame 25 connecting the bridge plate 20 with the slide channels 26 provides that the guide rails 24 and brace panel 22 will nest substantially horizontally under the platform floor 30, rather than parallel to the sloping bridge plate, so that neither the guide rails nor the brace panel project below the bottom edge of the carriage arm 12. These transfer-level nesting features of the parallelogram links and bridge plate assembly of the UFL of the invention provide that once the UFL is at transfer level, it is ready for retraction to the stowed position with no further platform movement. Only the hand rails 54, 54' project beyond the carriage frame plane, and these may be folded inwards towards the platform centerline as shown by Arrows HR and HR' upon removal of locking pins 55, 55' to lie flat adjacent to the platform floor 30.

FIG. 8 illustrates the geometry which controls the rotational-telescoping motion of the bridge plate assembly C in co-ordination with the movement of the platform D relative to the carriage frame B along the arc indicated by Arrow PL, showing carriage frame at transfer level configuration supported by rollers 16 on header channel 4. This geometry is defined by the two hinge axes: Brace panel hinge 28 connecting to the carriage frame beam 10, and bridge panel hinge 29 connecting to the platform; and by the sliding junction of the guide rails 24 and the slide channels 26, which permits the bridge plate assembly to change its length (telescope). The bridge plate assembly C is in effect an extensible/contractible link between hinge pivots 28, 29, and is slaved to rotate as a whole as the angular position of hinge 29 changes relative to hinge 28. Likewise the bridge plate assembly is slaved to telescope in/out as the distance between hinge 29 and hinge 28 changes with platform motion. The selected geometry of this system provides that the bridge plate 20 will come to lie along the slightly sloped upper surface of transverse beam, 10 as the platform reaches the transfer level, with the inboard end 15 of the bridge plate meeting the fixed transition strip 27. With the UFL at the transfer level, the slope of the platform floor and bridge plate is from about 1° to about 10°, and preferably about 2° for the platform floor and about 5° for the bridge plate. Slots or recesses 11 in transverse beam 10 are provided as needed to allow the guide rails 24 and slide channels 26 to rotate without interfering with the transverse beam 10. See also FIG. 4. The transition strip is fixed to the inboard edge of transverse beam 10 and has a width and angle of mounting selected to provide a close mating with the vehicle floor level 7 at the top riser 17 location of stairwell W, while having sufficient clearance below the floor to allow it to be retracted under the floor. See also FIG. 10 for an isometric view of the relationship between bridge plate 20, strip 27 and platform floor 30.

FIGS. 6C and 9 how the carriage drive system E used to extend or retract the carriage and platform assembly from or to the stowage position under the vehicle floor. FIG. 9 is a section view taken along line 9—9 in FIG. 6C. FIG. 6C shows those elements of the drive system which are mounted within the carriage frame B, and FIG. 9 shows schematically the drive chain arrangement and the telescoping mounting of the carriage frame within the header frame A. Turning to FIG. 6C, the drive motor assembly 60 (including associated controls and reduction gearing) is shown, in plan view, fixedly mounted within the transverse beam 10 with its output shaft oriented horizontally and transversely with respect to the carriage frame. The motor assembly 60 drives the motor output sprocket 62. Jack shaft 68 is oriented parallel to the output shaft of the motor assembly and is located adjacent the inboard side of the transverse beam 10 in a position allowing it to pass underneath (or optionally over or behind) the lifting cylinder 80. The jack shaft 68 is rotatably mounted by suitable bearings to the sides of the forward carriage arm 12 and the rear carriage arm 14, with each shaft end extending through an aperture in the side of the corresponding carriage arm into the space between the carriage frame and the corresponding header frame channel 4, 6 respectively. A jack shaft sprocket 66 is mounted on the medial portion to the jack shaft 68 in the same plane as the motor output sprocket 62, and transfer chain 64 forms a closed loop engaging the teeth of both sprockets, thereby providing for power transfer from the drive motor to the jack shaft. A pair of carriage drive sprockets 70, 70' are mounted at the forward and rear ends of the jack shaft 68, respectively.

As shown in FIG. 9, the carriage frame B is telescopingly mounted in a nested configuration within the header frame A and is supported by a plurality of carriage support rollers 16 (preferably at least four on each arm) rotatably mounted on the upper and lower surfaces of the carriage arms 12, 14 and bearing upon the upper and lower inner surfaces of the header frame channels 4, 6 respectively. The carriage frame is shown in solid lines as fully extended, and in phantom lines as partially retracted within the header frame. One of a pair drive chains is mounted on each side of the header frame and is disposed longitudinally in the space between the carriage arms and the header channels. The drive chain installation is substantially the same on each side of the carriage frame, and only the forward side is shown in FIG. 9, with corresponding components being installed on the rearward side. The drive chain 74 is fixedly attached at its inboard end to the inboard header plate 2 by means of inboard drive chain bracket 76, and at its outboard end to the inner surface of the header channel 6 adjacent the outboard channel end 9 by means of outboard drive chain brackets 78. The drive chain engages the teeth of drive sprocket 70 on its lower and outboard rim and the chain then leads upward to engage the inboard and upper rim of drive chain roller 72, which is mounted adjacent to and above the drive sprocket 70 on the rearward surface of the carriage arm 14. The drive chain then leads outboard to attach to the outboard drive chain bracket 78. As the jack shaft (68 in FIG. 6C) is driven by drive motor/gear assembly 60 (by means of motor output sprocket 62, transfer chain 64 and jack shaft sprocket 66) the drive sprocket 70 is caused to rotate (clockwise or counter clockwise depending on whether the carriage is extending or retracting) as shown by double headed Arrow DS. The carriage is thereby pulled outboard or inboard respectively as shown by double headed Arrow ER as the sprockets walk along the fixed chains 74. The chain roller 72 changes only the vertical position of a variable medial portion of the drive chain 74 to control the engagement of the chain with the drive sprocket 70, and the drive chain does not move in the inboard/outboard direction. Thus, the telescoping motion if the carriage is produced by the drive sprocket pulling the carriage along the drive chain, the drive chain being the equivalent of a fixed track. The chain and sprocket carriage drive system provides a versatile and effective reversible traction means, although alternatives, such as a rack-and-pinion means, may be employed.

FIG. 10 is an isometric view of the UFL of the principal embodiment of the invention in the same orientation as in FIGS. 1 and 7, but with the platform assembly and carriage frame retracted to the stowage position under the vehicle floor. In comparison with FIG. 7, FIG. 10 shows the handrails 54, 54' folded criss-crossed towards the platform centerline lying adjacent the platform floor 30. The platform assembly D is in the same nested transfer-level configuration relative to the carriage frame B as shown in FIG. 7, but the entire carriage frame/platform assembly combination has been retracted inboard by means of the carriage drive system until the inboard edge of the carriage frame transverse beam 10 lies adjacent the inboard header plate 2. The carriage arms 12, 14 lie nested within the header channels 4, 6 with the entire carriage frame/platform assembly combination lying underneath the vehicle floor 7. The roll stop 48 (in its vertical closed position) is the most outboard portion to the platform assembly, and is coplanar with the edge 17 of floor 7 and forms the top riser of the stairwell W. The stair well is thus not blocked by any UFL components, and foot passengers may enter and exit, walking between the header channel ends 18, 19 directly to/from the vehicle floor. In the principal embodiment, the roll stop 48 is sized and shaped to substantially cover the vertical gap and form the top stairwell riser in the UFL stowed configuration, and thus forms an integral cover plate for the opening of the header frame through which the carriage/platform is retracted.

The UFL of the invention may include a barrier, such as a rollstop, mounted adjacent the outboard end of said platform. See, for example, the rollstop 48 shown in FIG. 7.

The UFL of the invention may include handrails mounted to said platform. The hand rails may be collapsible toward the floor of said platform. See, for example, the right handrail 54 shown in FIG. 7, collapsible to the left parallel to rollstop 48 as shown by Arrow HR See also the left handrail 54' shown in FIG. 7, alternatively collapsible inboard in the direction of the doorway 3 and parallel to the side beam 32' towards the platform floor as shown by Arrow HR'.

The UFL of the invention may include barrier rails mounted adjacent the outboard end of said platform. The barrier rails may be pivotable from transversely across the lift platform to parallel to the side rails, the transverse orientation occurring when the lift platform is out of ground contact and the parallel orientation occurs when the platform makes contact with the ground. The barrier rails may be collapsible toward the floor of the platform. The barriers may be selected from handrails, foot barriers, lower leg barriers, and torso barriers. See, for example, the rails 54, 54' shown in FIG. 11. The rails 54, 54' are pivotable from transversely across the lift platform to parallel to the side rails 32 as shown by Arrows P, P', and the rail height may be selected to suit the occupant body member height as shown by Arrow H.

The controls of the UFL may be conventional controls for the electrical and hydraulic components of the UFL. The best mode embodiment incorporates an umbilical cable mounted control box which may be extended outside the vehicle through the doorway to allow an operator standing on the ground adjacent the vehicle doorway to operate the UFL in both up/down and extend/retract modes.

Industrial Applicability

It is clear that the improved UFL of this invention has wide industrial applicability to assist the handicapped in mobility, particularly when mounted on school buses, transit vehicles, trains and the like. It may also be adapted for vans, sport utility vehicles, pickup trucks and the like. In addition, the increased stability makes it ideal for transfer of heavy objects, such as drums, crates and packages up and down stairs when the assembly is mounted in a bay formed as a packet in the riser of a top stair.

It should be understood that various modifications within the scope of this invention can be made by one of ordinary skill in the art without departing from the spirit thereof We therefore wish our invention to be defined by the scope of the appended claims as broadly as the prior art will permit, and in view of the specification if need be.

We claim:

1. A wheelchair lift mountable on a vehicle adjacent a vehicle doorway having a centerline and telescopingly stowable below the vehicle floor, comprising:
   a) a U-shaped header frame fixedly mounted to said vehicle frame adjacent to and beneath said vehicle floor, said header frame being oriented in a horizontal plane and having an inboard transverse header portion fixed at each end thereof to one end of one of a pair of spaced, parallel, elongated channel members;
   b) each of said pair of channel members being oriented perpendicularly to said doorway and having a second, outboard end extending beyond an edge of said floor overlying the space between said channels, said outboard ends being adjacent to opposite sides of said doorway;
   c) a U-shaped carriage frame nestably and telescopingly mounted within said channels of said header frame, said carriage frame being oriented in a horizontal plane and having an inboard transverse beam portion fixed at each end to a first inboard end of each of a pair of first and second spaced, parallel, elongated carriage arm members;
   d) each of said pair of carriage arms being oriented generally parallel to said header channels and having a second, outboard end, and having an inner side facing the centerline of said doorway; each of said pair of arm members being slidably and movably supported within one of said pair of header channels;
   e) said carriage frame is moveable in said channels from a first inboard position underneath said floor outwardly to a second, deployed position;
   f) a generally rectangular platform assembly sized to support a wheelchair, said platform being oriented generally horizontally and having a first and a second spaced side member oriented parallel to said arms; said platform having a side-to-side width less than the distance between said pair of spaced, parallel carriage arm members and having an inboard and an outboard end;
   g) each of said platform sides being pivotably connected to a first end of a first and a second pair of parallelogram linkages adjacent the inboard end of said platform sides, said pairs of linkages each lying in a vertical plane, a second end of each of said pairs of linkages being pivotably connected adjacent said outboard end of said arms;
   h) said platform being arcuately swingable on said first and second pairs of parallelogram linkages from ground level upwardly and inboardly to nest between said arms at a wheelchair transfer level, and back to ground level;
   i) a telescoping bridge plate assembly hingedly attached at an outboard end to an inboard end of said platform and at an inboard end to said transverse beam of said carriage frame;
   j) a lifting means connecting said platform with said carriage frame for lifting and lowering said platform between said levels;
   k) said bridge plate slidably changing orientation from substantially horizontal at a first transfer level of said lift to an inclined angle to form an inboard barrier when said lift is at a second, ground level, and mounted to assist in resisting side sway of said lift during motion between said levels; and
   l) a driving assembly for telescoping said carriage frame inboardly and outboardly.

2. A wheelchair lift as in claim 1, wherein said driving assembly includes a mechanism connecting said carriage frame to said header frame for telescopingly stowing said carriage inwardly into said header and deploying said carriage outwardly for lifting and lowering of said platform.

3. In a lift having a platform with an inboard end and an outboard end, a lifting mechanism for moving said platform between at least a first, lowered, ground level and a second, raised transfer level and a support structure for mounting in association with said transfer level, the improvement comprising:
   a) an interconnecting bridge assembly mounted to said platform and to said support structure providing a raised inboard barrier when said platform is in said ground level position and a generally horizontal bridge plate effectively spanning from the inboard end of said platform to said transfer level when said platform is at said transfer level;
   b) said bridge assembly mounted to brace said platform against side-to-side sway motion during travel of said platform between said ground level and said transfer level; and
   c) said bridge assembly including telescoping members for maintaining the interconnection of said bridge assembly throughout the varying distance between said platform inboard end and said transfer level during motion of said platform between said ground level and said transfer level.

4. An improved lift as in claim 3, wherein:
a) said bridge assembly comprises a first bridge plate pivotally mounted adjacent the inboard end of said platform and at least one second plate member pivotally mounted to said support structure adjacent said transfer level; and
b) said plates are slidably interconnected in an interleaved configuration by a slide means permitting said plates to reciprocate relative to each other upon motion of said platform between said levels while rotating about said pivotal mountings to form a raised barrier in said ground level position and to form a generally horizontal bridge plate in said transfer level position.

5. In a lift having a platform with an inboard end and an outboard end, a lifting mechanism for moving said platform between at least a first, ground level and a second transfer level and a support structure for mounting in association with said transfer level, the improvement comprising:
a) telescopingly interleaved bridge structure comprising a first bridge plate pivotally mounted at one end adjacent the inboard end of said platform and at least one second plate member pivotably mounted at one end adjacent said transfer level;
b) interconnecting slide members mounted to said first and second plates to permit said plates to reciprocate relative to each other upon motion of said platform between said levels to form a raised barrier in a lowered ground level position and a generally horizontal bridge plate effectively spanning from the inboard end of said platform to said transfer level at said transfer level; and
c) said bridge structure interconnections reducing side sway of said lift during lifting and descent.

6. An improved lift as in claim 5, wherein:
a) said platform is sloped upwardly from outboard to inboard.

7. An improved lift as in claim 5, wherein;
a) said bridge plate and said second plate are slidably interconnected.

8. An improved lift as in claim 7, wherein;
a) said lift platform is pivotably secured to said lifting mechanism by spaced parallelogram linkages.

9. An improved lift as in claim 8, wherein;
a) said parallelogram linkage is linked between said lifting mechanism and said platform to provide an in-swing motion from said ground level to said transfer level, and said lift platform remains negative during its travel from ground level to transfer level.

10. An improved lift as in claim 9, wherein;
a) said lift is an under floor type lift and said support structure includes a traveling carriage assembly to which said lifting mechanism is mounted.

11. An improved lift as in claim 10, wherein;
a) said carriage is actuated from a first, retracted, stowed position to an extended lifting position by motor actuated chain drive.

12. An improved lift as in claim 8, wherein;
a) said parallelogram linkages are linked at their outboard end to said carriage mechanism and at their inboard end to the inboard end of said platform.

13. An improved lift as in claim 12, wherein;
a) said parallelogram links are passive guide links.

14. An improved lift as in claim 13, wherein;
a) said lifting mechanism comprises a hydraulic cylinder-actuated chain drive mechanism.

15. An improved lift as in claim 5, which includes a barrier mounted adjacent the outboard end of said platform.

16. An improved lift as in claim 15, wherein said barrier is a rollstop.

17. An improved lift as in claim 5, which includes handrails mounted to said platform.

18. An improved lift as in claim 17, wherein;
a) said hand rails are collapsible toward the floor of said platform.

19. An improved lift as in claim 5, which includes barrier rails mounted adjacent the outboard end of said platform.

20. An improved lift as in claim 19, wherein;
a) said platform includes a pair of spaced side rails oriented transverse to said platform ends; and
b) said barrier rails are pivotable from transversely across said lift platform to parallel to the side rails, said transverse orientation occurring when said lift platform is out of ground contact and said parallel orientation occurs when said platform makes contact with the ground.

21. An improved lift as in claim 21, wherein;
a) said rails have a height selected to provide barriers corresponding to the height of at least one of the hands, feet, lower legs and torso of an occupant of a wheelchair on said platform.

22. An improved lift as in claim 20, wherein;
a) said barrier rails are collapsible toward the floor of said platform.

23. A method of reducing side sway in a lift assembly having a platform with an inboard end, an outboard end, a bridgeplate pivotally mounted to said platform adjacent the inboard end of said platform, a lifting mechanism for moving said platform between at least a first, ground level and a second transfer level and a support structure for mounting said lift in association with said transfer level, comprising the steps of:
a) structurally linking the inboard end bridgeplate of said platform to said support structure independent of the lifting mechanism; and
b) maintaining said platform, said bridgeplate, and said structure substantially continuously structurally linked as the span there between changes during lifting and descent of said platform.

24. The method as in claim 23, wherein:
a) said linking includes providing a first bridge plate pivotally mounted adjacent the inboard end of said platform and providing at least one second plate member pivotally mounted to said support structure adjacent said transfer level; and
b) said maintenance of linking includes providing a slidable interconnection between said plates in an interleaved configuration by a slide means permitting said plates to reciprocate relative to each other upon motion of said platform between said levels while rotating about said pivotal mountings.

25. The method as in claim 23, wherein:
a) said linking includes providing a telescopingly interleaved bridging structure comprising a first bridge plate pivotally mounted at one end adjacent the inboard end of said platform and at least one second plate member pivotably mounted at one end adjacent said transfer level; and
b) said maintenance of linking includes providing slide members mounted to permit said plates to reciprocate relative to each other upon motion of said platform between said levels.

* * * * *